(12) United States Patent
Park

(10) Patent No.: US 12,185,271 B2
(45) Date of Patent: Dec. 31, 2024

(54) OBJECT POSITION-MEASURING DEVICE, METHOD, AND SYSTEM

(71) Applicant: LG ELECTRONICS INC., Seoul (KR)

(72) Inventor: Byung Chang Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 328 days.

(21) Appl. No.: 17/761,765

(22) PCT Filed: Sep. 24, 2019

(86) PCT No.: PCT/KR2019/012381
§ 371 (c)(1),
(2) Date: Mar. 18, 2022

(87) PCT Pub. No.: WO2021/060574
PCT Pub. Date: Apr. 1, 2021

(65) Prior Publication Data
US 2022/0377696 A1    Nov. 24, 2022

(51) Int. Cl.
*H04W 64/00* (2009.01)
*G01S 5/06* (2006.01)

(52) U.S. Cl.
CPC ............ *H04W 64/003* (2013.01); *G01S 5/06* (2013.01)

(58) Field of Classification Search
None
See application file for complete search history.

(56) References Cited

U.S. PATENT DOCUMENTS

| 10,365,657 B2 * | 7/2019 | Tokuyama ........... G05D 1/0246 |
| 2015/0133173 A1 * | 5/2015 | Edge .................... G01S 5/08 |
| | | 455/456.6 |

FOREIGN PATENT DOCUMENTS

| KR | 10-2013-0093025 A | 8/2013 |
| KR | 10-2018-0052949 A | 5/2018 |
| KR | 10-2018-0083095 A | 7/2018 |
| KR | 10-2019-0084405 A | 7/2019 |

* cited by examiner

*Primary Examiner* — Frantz Bataille
(74) *Attorney, Agent, or Firm* — Birch, Stewart, Kolasch & Birch, LLP

(57) ABSTRACT

An object position-measuring device, a method thereof, and a system thereof are proposed. The object position-measuring device, method thereof, and system thereof are for measuring a position of an object by using a plurality of wireless signals indoors. In the object position-measuring device, method thereof, and system thereof, respective distances from the position-measuring device and first and second wireless communication devices to the object are calculated by using respective travel times of the wireless signals respectively transmitted from the position-measuring device and the first and second wireless communication devices and the wireless signals received after being reflected from the object, whereby the position of the object is measured by using the calculated distances.

16 Claims, 12 Drawing Sheets

OBJECT POSITION-MEASURING DEVICE, METHOD, AND SYSTEM

CROSS REFERENCE TO RELATED APPLICATIONS

This application is the National Phase of PCT/KR2019/012381 filed on Sep. 24, 2019, which is hereby expressly incorporated by reference into the present application.

TECHNICAL FIELD

The present disclosure relates to object position measurement and, more particularly, to an object position-measuring device, a method thereof, and a system thereof for measuring a position of an object by using a plurality of wireless communication signals.

BACKGROUND ART

Location-based technology is technology that acquires physical, geographic, or logical position information of an object in a specific location, and responds appropriately to the acquired information.

Conventional methods of measuring a position include: a triangulation method of measuring the position on the basis of differences in distance, angles, or azimuth angles between objects; a scene analysis method of using a landscape viewed from a specific vantage point; and a proximity method of locating a particular position by proximity.

In addition, with the development of wireless communication technology, radio wave identification systems are spotlighted as new wireless network technology, and are widely used. In addition, the development of technology to measure indoor or outdoor positions by using the radio wave identification systems is required, and such technology is used for various purposes in which radio wave identification is utilized in an area that is unable to be reached by people, so as to collect data, or transmit the collected data to users, or the like.

Conventional position-measuring technology includes a variety of technology such as position-measuring technology using a global positioning system (GPS), position-measuring technology using reception signal strength of wireless signals, and position-measuring technology using short-range wireless communication.

The position-measuring technology using GPS is technology that measures a distance to a satellite by measuring (i.e., absolute positioning) phases of carrier signals sent from the GPS satellite orbiting the Earth, or by tracing (i.e., relative positioning) codes of the carrier signals.

Since the position-measuring technology using GPS has a wide signal radius and is capable of providing stable services through fixed satellites, the technology is currently the most used. However, the technology has a disadvantage that services are unavailable in an indoor or shaded area where precision of positioning is low and reception of GPS satellite signals is difficult.

The position-measuring technology using mobile communication is technology for acquiring geographical position information of a mobile terminal by the triangulation method using a currently established mobile communication system, and includes: a network-based method in which a location of a terminal is identified through interworking between a base station in a service cell area of the terminal and neighboring base stations; a terminal-based method in which a terminal having a GPS receiver separately transmits position information to a network apart from a base station; a hybrid method in which the above-described two methods are mixed; and the like.

These technologies do not require a separate infrastructure construction and are widely used as macro position-measuring technology because of having wide service areas thereof as in the GPS technology. However, there a problem that such technologies may be used only within a radius of a cell where a base station is located or in a central city where radio wave reception is available, and also there is a problem that indoor accuracy is deteriorated due to diffraction, multipaths, and signal attenuation according to characteristics of radio waves.

These position-measuring technologies using satellite communication or mobile communication have a wide service provision area and are suitable for outdoor use, but have restrictions on their use indoors or in shaded areas.

Accordingly, recently, indoor position-measuring technologies using various wireless communication technologies such as Diffuse-Infrared, Ultrasonic Wave, Radio Frequency (RF), Ultra-Wideband (UWB), and radio wave identification are being actively researched.

In addition, these indoor position-measuring technologies may be applied to user-centered home appliances, and when a product service is provided according to a user's position in an indoor space, the need for the object position-measuring method is emerging for the object to be positioned.

Meanwhile, as a technology for measuring a position of an object present indoors by using wireless signals output from a plurality of wireless communication devices distributed the indoors, as an example, Korean Patent No. 10-1422720 discloses "METHOD AND SYSTEM FOR WIFI-BASED INDOOR POSITIONING", regarding a method and a system thereof for indoor positioning of a positioning terminal.

In the related art document, the disclosed method and system are provided as a method and a system for measuring a position of a wireless terminal positioned in a building by using an access point (AP) in a Wi-Fi system, wherein the position of the positioning terminal is measured on the basis of signal strength from a plurality of access points (AP) to the positioning terminal.

DISCLOSURE

Technical Problem

An objective of the present disclosure is to provide an object position-measuring device, a method thereof, and a system thereof capable of measuring a position of an object by using wireless signals transmitted from a plurality of wireless communication devices distributed indoors.

Another objective of the present disclosure is to provide an object position-measuring device, a method thereof, and a system thereof capable of measuring a position of an object by using travel times of wireless signals received directly after being transmitted from wireless communication devices and the travel times of the wireless signals received after being reflected on the object.

Yet another objective of the present disclosure is to provide an object position-measuring device and an object position-measuring system including the same capable of measuring a position of an object by means of one transmitting antenna and one receiving antenna provided therein to respectively transmit and receive wireless signals and using a plurality of received wireless signals.

Still another objective of the present disclosure is to provide an object position-measuring system that is applicable to home appliances and that enables the home appliances to accurately detect a user's position and an activity level and adaptively operate according to the detected user's position.

The problems of the present disclosure are not limited to the above-mentioned problems, and other problems not described above will be clearly understood by those skilled in the art from the description of the claims.

Technical Solution

According to an exemplary embodiment of the present disclosure, an object position-measuring device includes: a transmitting unit configured to transmit a wireless signal through a transmitting antenna; a receiving unit configured to receive a plurality of wireless signals through a receiving antenna; and a controller configured to measure a position of an object by using a travel time of each of the plurality of wireless signals received by the receiving unit.

In this case, the controller may calculate a travel time of the wireless signal transmitted from the transmitting unit to the object, a travel time of a wireless signal transmitted from a first wireless communication device to the object, and a travel time of a wireless signal transmitted from a second wireless communication device to the object, calculate respective distances from the transmitting unit, first and second wireless communication devices to the object on the basis of the calculated travel times, and then measure the position of the object by using the calculated distances.

The controller may store respective position information of the position-measuring device and the first and second wireless communication devices, and calculate respective distances between the position-measuring device and the first and second wireless communication devices by using the stored position information.

In addition, the controller may calculate transmission time points of the wireless signals respectively transmitted from the position-measuring device and the first and second wireless communication devices by using the stored position information and moving speed of each wireless signal.

In addition, the controller may calculate the travel times of the received wireless signals by using the transmission time points and reception time points of the received wireless signals.

In addition, the controller may calculate the travel time To by using a travel time Tr of a wireless signal transmitted from the transmitting unit and reflected from the object, calculate the travel time T1o by using a time difference between a travel time T1or of a wireless signal transmitted from the first wireless communication device and reflected from the object and the calculated travel time To, and calculate the travel time T2o by using a time difference between a travel time T2or of a wireless signal transmitted from the second wireless communication device and reflected from the object and the calculated travel time To.

Accordingly, the controller may measure the position of the object by using a triangulation method on the basis of the calculated travel times To, T1r, and T2r.

In addition, according to the exemplary embodiment of the present disclosure, an object position-measuring system includes: a first wireless communication device configured to transmit a wireless signal; a second wireless communication device configured to transmit a wireless signal different from the wireless signal transmitted by the first wireless communication device; and a position-measuring device measuring a position of the object by receiving a plurality of wireless signals, wherein the position-measuring device may calculate a travel time To of a wireless signal transmitted from the position-measuring device to an object, a travel time T1o of the wireless signal transmitted from the first wireless communication device to the object, and a travel time T2o of the wireless signal transmitted from the second wireless communication device to the object, and measure the position of the object by calculating respective distances between the position-measuring device and the first and second wireless communication devices on the basis of the calculated travel times To, T1o, and T2o.

The position-measuring device may calculate the respective distances between the position-measuring device and the first and second wireless communication devices by using internally stored position information of the position-measuring device and the first and second wireless communication devices, and calculate transmission time points of the wireless signals respectively transmitted from the position-measuring device and the first and second wireless communication devices by using the stored position information and by using moving speed of the wireless signals.

In addition, the position-measuring device may calculate the travel times of the received wireless signals by using reception time points and the transmission time points of the received wireless signals.

In addition, the position-measuring device may calculate a travel time To by using a travel time Tr of a wireless signal transmitted from a transmitting unit and reflected from the object, calculate the travel time T1o by using a time difference between a travel time T1or of a wireless signal transmitted from the first wireless communication device and reflected from the object and the calculated travel time To, and calculate the travel time (T2o) by using a time difference between a travel time (T2or) of a wireless signal transmitted from the second wireless communication device and reflected from the object and the calculated travel time (To).

Accordingly, the position-measuring device may measure the position of the object by using a triangulation method on the basis of the calculated travel times To, T1r, and T2r.

The position-measuring device and the first and second wireless communication devices may transmit respective wireless signals at the same time.

Meanwhile, the position-measuring device and the first and second wireless communication devices may be mounted on at least one or more position-fixed devices selected from an air conditioner, a smart TV, a refrigerator, a lighting device, a computer, and a sound device, or may be mounted on at least one or more position-movable devices selected from a robot vacuum cleaner, a laptop computer, a fan, and a speaker.

In addition, according to the exemplary embodiment of the present disclosure, an object position-measuring method includes: storing, in a position-measuring device, position information of the position-measuring device itself and first and second wireless communication devices; calculating respective distances from the position-measuring device to the first and second wireless communication devices; transmitting a wireless signal from the position-measuring device; receiving a plurality of wireless signals by the position-measuring device; and measuring a position of an object on the basis of the plurality of received wireless signals.

In this case, the measuring the position of the object may calculate a travel time To of a wireless signal transmitted from the position-measuring device to the object, a travel time T1o of a wireless signal transmitted from the first wireless communication device to the object, and a travel time T2o of a wireless signal transmitted from the second wireless communication device to the object, and measure the position of the object by calculating respective distances from a transmitting unit and the first and second wireless communication devices to the object on the basis of the calculated travel times To, T1o, and T2o.

Advantageous Effects

The object position-measuring device, the method thereof, and the system thereof according to the exemplary embodiment of the present disclosure have the following effects.

According to the present disclosure, the position of the object may be measured by using a plurality of wireless communication devices previously installed indoors.

According to the present disclosure, since the plurality of wireless communication devices installed indoors is used, the position of the object may be measured at a low cost.

According to the present disclosure, since the position of the object may be measured by using the travel times of wireless signals received directly after being transmitted from the wireless communication devices and the travel times of the wireless signals received after being reflected on the object, a data processing logic is easy and simple.

According to the present disclosure, since one transmitting antenna and one receiving antenna are provided, space and cost for installing the antennas may be reduced.

According to the present disclosure, since the position of the object indoor is measured, services may be provided adaptively according to the object position measured by home appliances installed indoor.

MODE FOR INVENTION

Figure 1:
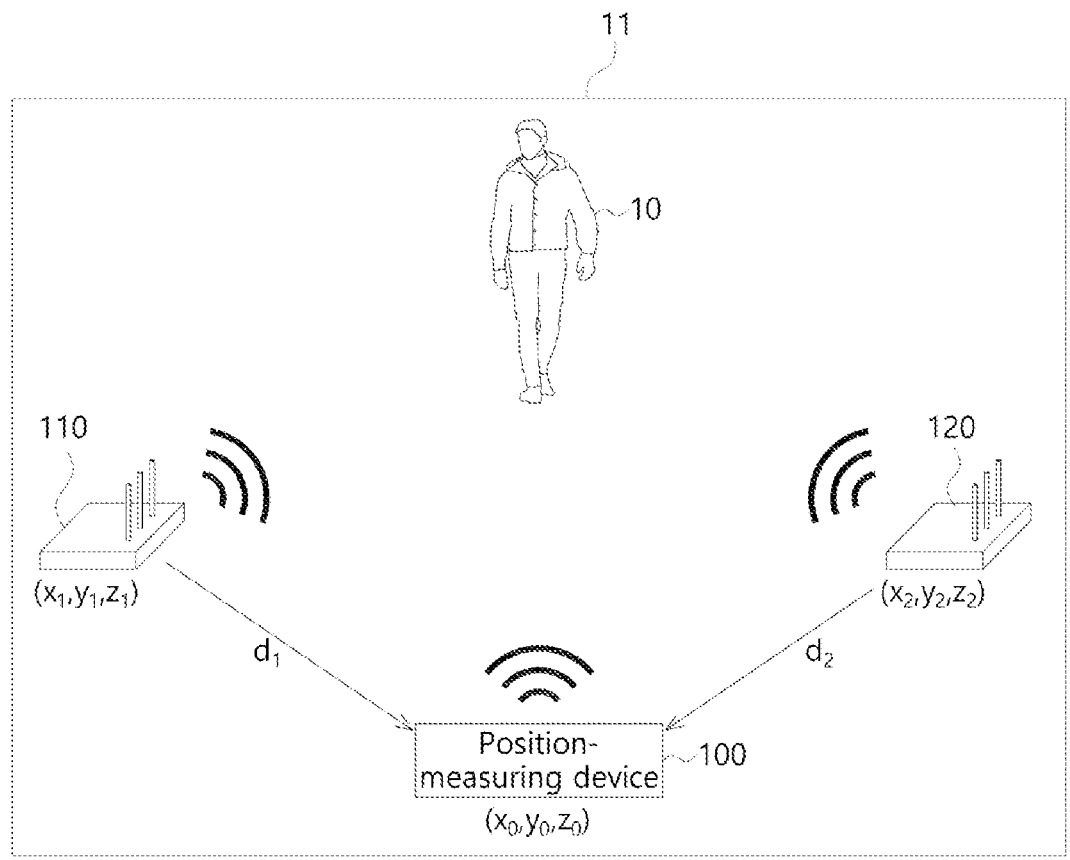
FIG. 1 is a block diagram of an object position-measuring system according to an exemplary embodiment of the present disclosure.

Advantages and features of the present disclosure, and a method of achieving them will become apparent with reference to the exemplary embodiments described below in detail together with the accompanying drawings. However, the present disclosure is not limited to the exemplary embodiments disclosed below, but will be implemented in a variety of different forms. These exemplary embodiments are provided only to complete the disclosure of the present disclosure and to completely inform the scope of the present disclosure to those skilled in the art to which the present disclosure pertains, and the present disclosure is only defined by the scope of the claims. Like reference numerals generally denote like elements throughout the present disclosure.

FIG. 1 is a block diagram of an object position-measuring system according to the exemplary embodiment of the present disclosure.

Referring to FIG. 1, the object position-measuring system according to the exemplary embodiment of the present disclosure may be configured to include: an object position-measuring device 100 (hereinafter referred to as a position-measuring device); and at least two or more wireless communication devices 110 and 120.

The position-measuring device 100 and the wireless communication devices 110 and 120 may be respectively installed at positions spaced apart a predetermined distance from each other in an indoor space 11 having a predetermined area, and may be able to communicate with each other.

Such wireless communication devices 110 and 120 may include, for example, a first wireless communication device 110 and a second wireless communication device 120, wherein each device may transmit a wireless signal to the air. Although the drawing illustrates two wireless communication devices 110 and 120, two or more wireless communication devices may be installed.

A wireless signal transmitted from the first wireless communication device 110 and a wireless signal transmitted from the second wireless communication device 120 may be signals different from each other. For example, the wireless signals may respectively have different frequency bands.

The position-measuring device 100 may transmit the wireless signals to the outside. The wireless signals transmitted from the position-measuring device 100 may be different from the wireless signals respectively transmitted from the first and second wireless communication devices 110 and 120. For example, the wireless signals may respectively have different frequency bands.

In addition, in the present exemplary embodiment, the position-measuring device 100 may receive a wireless signal transmitted from the position-measuring device 100 itself and reflected by an object 10 (i.e., a person or a thing).

In addition, the position-measuring device 100 may receive wireless signals respectively transmitted from the first and second wireless communication devices 110 and 120. Specifically, the position-measuring device 100 may directly receive the wireless signals respectively transmitted from the first and second wireless communication devices 110 and 120, and may receive the wireless signals reflected by the object 10 after these wireless signals are transmitted.

Meanwhile, the position-measuring device 100 and the first and second wireless communication devices 110 and 120 may have respective position information set therefor. Accordingly, the position-measuring device 100 may store respective position information therein, including its own position information (x0, y0, z0), position information (x1, y1, z1) of the first wireless communication device 110, and position information (x2, y2, z2) of the second wireless communication device 120.

The position of the position-measuring device 100 and the respective positions of the first and second wireless communication devices 110 and 120 may be fixed. Naturally, the position-measuring device 100 and the first and second wireless communication devices 110 and 120 may be respectively moved to different positions, and also may be respectively fixed to the moved positions.

When the positions are moved, the respective position information may also be reset and stored in the position-measuring device 100.

A position of the object 10 may be fixed, but may be changed by movement.

As an example, such position information may be directly input into the position-measuring device 100 by an administrator (or a user). As another example, the position-measuring device 100 may separately receive the position information (x1, y1, z1) and the position information (x2, y2, z2) of the respective first and second wireless communication devices 110 and 120 through wireless communication with the first and second wireless communication devices 110 and 120.

In the exemplary embodiment, these pieces of position information may include three-dimensional (3D) position information, but may also include two-dimensional (2D) position information when necessary. For example, when the position-measuring device 100 and the first and second wireless communication devices 110 and 120 are installed at the same height (e.g., a floor of an indoor space) in the indoor space 11, the z coordinates are the same, so only x, y coordinates may also be set.

In this way, the position-measuring device 100 according to the present exemplary embodiment may measure a position of an object 10 by using a wireless signal transmitted by the position-measuring device 100 itself and reflected by the object 10 and the respective wireless signals transmitted by the first and second wireless communication devices 110 and 120 and reflected by the object 10.

In particular, the position of the object 10 may be measured by using a travel time of each wireless signal reflected by the object 10, that is, a travel time from a time point when each wireless signal is transmitted to a time point when each wireless signal is received by the position-measuring device 100.

The position-measuring device 100 and the first and second wireless communication devices 110 and 120 may respectively transmit wireless signals in real time or at a set period, and accordingly, the position-measuring device 100 may measure the position of the object 10 in real time or at the set period.

Meanwhile, in the present exemplary embodiment, devices in any form may be applicable as first and second wireless communication devices 110 and 120 as long as the devices are fundamentally transmitting wireless communication signals. For example, the first and second wireless communication devices 110 and 120 may be respectively implemented as IC chip modules capable of transmitting wireless signals. For example, each of first and second wireless communication devices 110 and 120 may include at least one or more modules selected from a Wi-Fi module, a Bluetooth module, and an RF module.

Additionally, the first and second wireless communication devices 110 and 120 may be capable of performing wireless communication with the position-measuring device 100. For example, upon receiving a command signal from the position-measuring device 100, respective wireless signals thereof may be transmitted according to the command.

Figure 2:
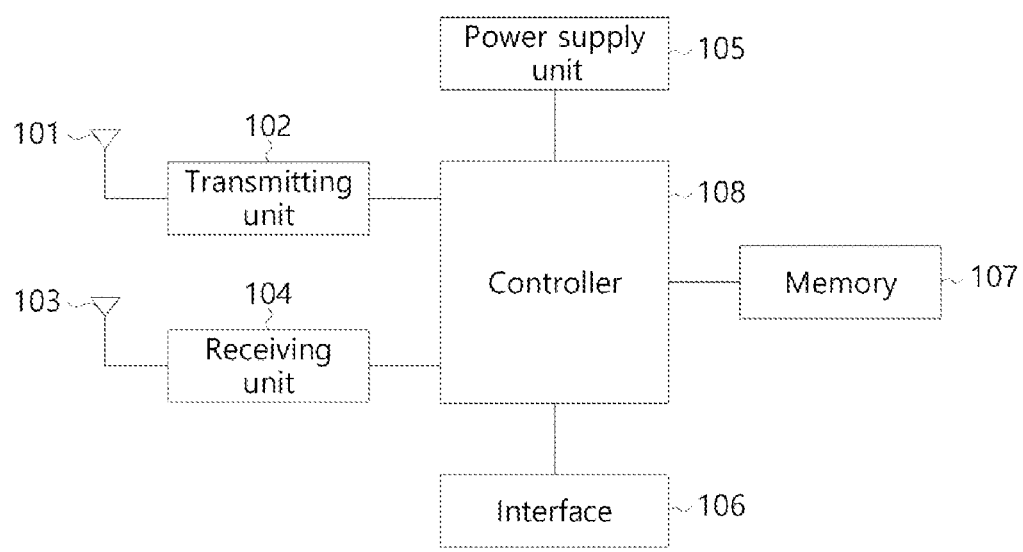
FIG. 2 is a block diagram of an object position-measuring device according to the exemplary embodiment of the present disclosure.

FIG. 2 is a block diagram illustrating the position-measuring device according to the exemplary embodiment of the present disclosure.

Referring to FIG. 2, the position-measuring device 100 may be configured to include a transmitting antenna 101, a transmitting unit 102, a receiving antenna 103, a receiving unit 104, a power supply unit 105, an interface 106, a memory 107, and a controller 108.

The transmitting unit 102 may transmit wireless signals. Such a transmitting unit 102 may include an oscillator and a transmission amplifier.

The oscillator is an oscillating element, such as a voltage control oscillator (VCO), and may generate signals. For example, the oscillator may generate a frequency modulated continuous wave (FMCW) waveform or a mono pulse waveform.

In the exemplary embodiment, a plurality of oscillators may be provided. For example, when there is provided the plurality of oscillators, a first oscillator may generate the frequency modulated continuous wave (FMCW) waveform, and a second oscillator may generate the mono pulse waveform.

The transmission amplifier includes an amplifier circuit, and may amplify signals generated by the oscillator.

The transmitting antenna 101 may transmit signals generated by the oscillator, or signals amplified by the transmission amplifier.

In another exemplary embodiment, the transmitting antenna 101 may be disposed inside the transmitting unit 102.

The transmitting unit 102 may further include a triangular wave generating unit according to the exemplary embodiment.

The receiving unit 104 may receive a wireless signal through the receiving antenna 103.

Here, the wireless signal received through the receiving antenna 103 may be a signal that is transmitted by the transmitting unit 102 and is reflected on and returned from the object 10. In addition, the wireless signals received through the receiving antenna 103 may be signals directly and respectively received after being transmitted by the first and second wireless communication devices 110 and 120, or may be signals respectively transmitted by the first and second wireless communication devices 110 and 120 and then received after being reflected by the object 10.

Such a receiving antenna 125 may include one antenna selected as needed among antennas, for example, a long range radar (LRR) antenna for receiving a signal from a long distance, a mid-range radar (MRR) antenna for receiving a signal from a middle distance, and a short range radar (SRR) antenna for receiving a signal from a short distance.

The receiving unit 104 may include a mixer, an amplifier, and a filter. In another exemplary embodiment, the receiving antenna 103 may be disposed inside the receiving unit 104.

The mixer may correlate a signal generated by the oscillator and a signal received by the receiving antenna 103 together so as to output a difference between the two signals.

The filter may filter signals received by the mixer.

The reception amplifier may amplify signals received by the receiving antenna 103 and signals received by the mixer or the filter.

Meanwhile, in another exemplary embodiment, the receiving unit 120 may include a first receiving unit and a second receiving unit. In this case, the first receiving unit and the second receiving unit may respectively include the above-described receiving antenna, mixer, filter, and reception amplifier.

In this case, the first receiving unit may receive wireless signals of the first wireless communication device 110, and the second receiving unit may receive wireless signals of the second wireless communication device 120.

The power supply unit 105 may supply power necessary for the operation of the position-measuring device 100. In the present exemplary embodiment, the power supply unit 105 may supply the power required for the operation of each unit under the control of the controller 108. Such a power supply unit 105 may receive the power from an external device.

The interface unit 106 may serve as a passage for exchanging data with a device connected to the position-measuring device 100. The interface unit 106 may receive data from an electrically connected unit and transmit a signal processed or generated by the controller 180 to the electrically connected unit.

The interface unit 106 may serve as the passage for exchanging data with devices including, for example, external smart devices, vehicles, home appliances, electronic devices, and the like.

The interface unit 106 may include an input unit, and the input unit may receive a user's operation. Such an input unit may be implemented in the form of, for example, an input button, a touch pad, or a touch screen.

The input unit may input the position information of the position-measuring device 100 and the position information of the first and second wireless communication devices 110 and 120.

In another exemplary embodiment, the input unit may further include a microphone for inputting audio such as, for example, a user's voice.

The memory 107 may store various pieces of data for the overall operation of the position-measuring device 100, including a program for processing or controlling of the controller 108, and the like.

Such a memory 107 may include, for example, various storage devices such as ROM, RAM, EPROM, flash drive, and hard drive in terms of hardware.

The controller 108 may control the overall operation of the position-measuring device 100.

In the present exemplary embodiment, the controller 108 measures the position of the object 10 by using a plurality of wireless signals, including: wireless signals received by the receiving unit 104 through the receiving antenna 103, that is, wireless signals transmitted by the position-measuring device 100 and reflected on the object 10; wireless signals directly and respectively received by the first and second wireless communication devices 110 and 120; and wireless signals respectively transmitted by the first and second wireless communication devices 110 and 120 and reflected on the object 10.

A method of measuring a position of the object 10 will be described in detail below.

In terms of hardware, for example, the controller 108 may be implemented by using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and other electrical units for performing functions.

Figure 3:
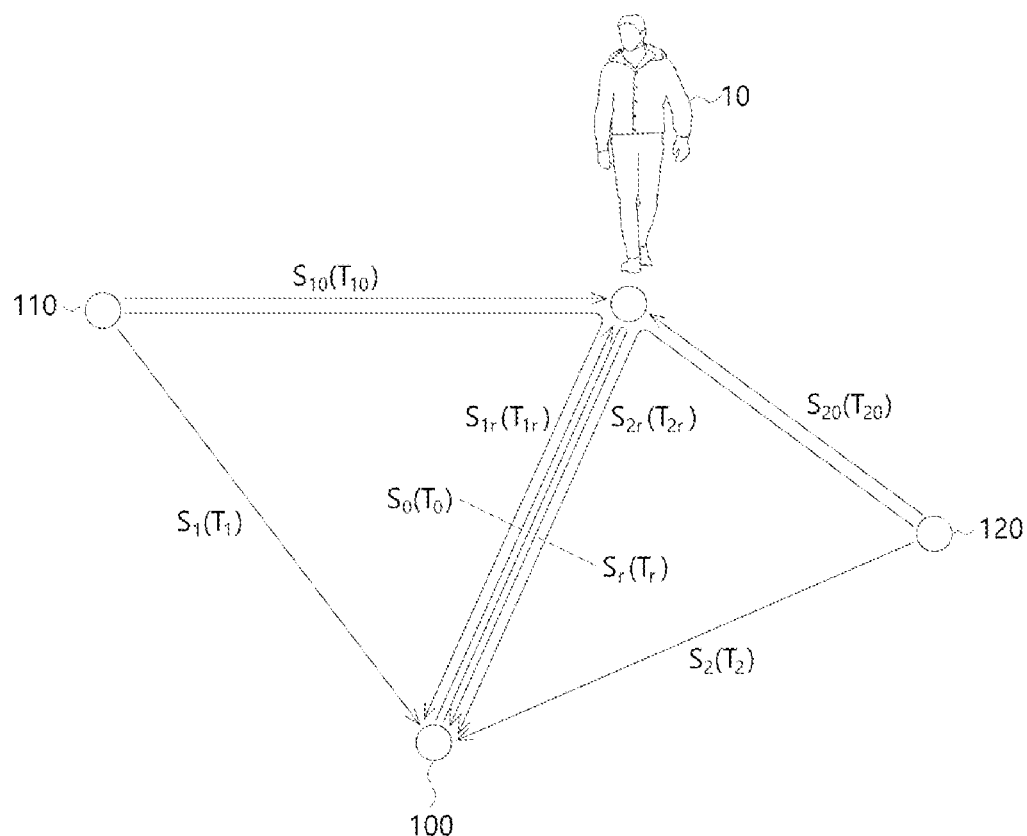
FIG. 3 is an exemplary view illustrating a process of measuring an object position in the object position-measuring device according to the exemplary embodiment of the present disclosure.
Figure 4:
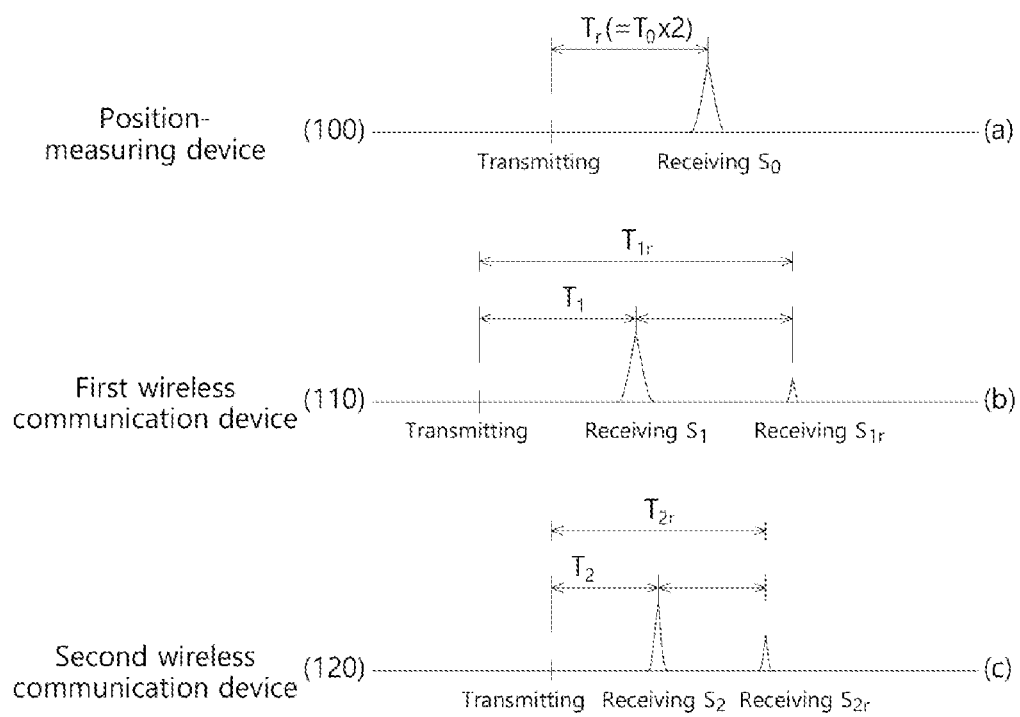
FIG. 4 is an exemplary view of a waveform of a wireless signal received in the object position-measuring device according to the exemplary embodiment of the present disclosure.

FIG. 3 is an exemplary view illustrating a process of measuring an object position in the object position-measuring device according to the exemplary embodiment of the present disclosure. FIG. 4 is an exemplary view of a waveform of a received wireless signal received in the object position-measuring device according to the exemplary embodiment of the present disclosure.

In describing the process of measuring a position of the object 10 in the position-measuring device 100 with reference to FIGS. 3 and 4, a wireless signal S and a travel time T of the wireless signal S are defined as follows:

1) Travel Time T of Wireless Signal S

To: a travel time of a wireless signal So transmitted from the position-measuring device 100 to the object 10

Tr: a travel time of a wireless signal Sr transmitted by the position-measuring device 100, reflected on the object 10, and then received by the position-measuring device 100

T1: a travel time of a wireless signal S1 directly transmitted from the first wireless communication device 110 to the position-measuring device 100

T1o: a travel time of a wireless signal S1o transmitted from the first wireless communication device 110 to the object 10

T1r a travel time of a wireless signal S1r transmitted from the first wireless communication device 110, reflected on the object 10, and then received by the position-measuring device 100

T2: a travel time of a wireless signal S2 directly transmitted from the second wireless communication device 120 to the position-measuring device 100

T2o: a travel time of a wireless signal S2o transmitted from the second wireless communication device 120 to the object 10

T2r: a travel time of a wireless signal S2r transmitted from the second wireless communication device 120, reflected on the object 10, and then received by the position-measuring device 100

Such a travel time may mean time it takes for a wireless signal to propagate.

Hereinafter, a process of measuring a position of an object 10 in the position-measuring device 100 by using a travel time (i.e., propagation time) of each wireless signal defined as above will be described in detail.

2) Calculation of Travel Time T1 of Wireless Signal S1

First, a travel time T1 of a wireless signal S1 transmitted directly to the position-measuring device 100 after being transmitted from the first wireless communication device 110 is calculated.

To this end, in the present exemplary embodiment, the controller 108 of the position-measuring device 100 may use its own position information (x0, y0, z0) stored therein, the position information (x1, y1, z1) of the first wireless communication device 110, and the position information (x2, y2, z2) of the second wireless communication device 120, so as to individually calculate respective distances d1 and d2 between the position-measuring device 100 and the first and second wireless communication devices 110 and 120.

When the first wireless communication device 110 transmits a wireless signal, the position-measuring device 100 may receive the wireless signal transmitted from the first wireless communication device 110.

Regarding the wireless signals of the first wireless communication device 110, the position-measuring device 100 may receive each of the wireless signal S1 transmitted directly from the first wireless communication device 110 to the position-measuring device 100 and the wireless signal S1r that is transmitted to and reflected from the object 10.

When the two wireless signals S1 and S1r are received in this way, the controller 108 may extract respective reception time points of the corresponding wireless signals and store the reception time points in the memory 107.

The two wireless signals S1 and S1r are simultaneously transmitted from the first wireless communication device 110, but since S1 is directly transmitted to the position-measuring device 100 and S1r is reflected and transmitted from the object 10, the reception time point of S1 may be earlier than the reception time point of S1r.

Since the moving speed (i.e., propagation speed) of a wireless signal is the speed of light (i.e., $3 \times 10^8$ m/sec), the controller 108 may calculate a transmission time point of the corresponding wireless signal S1, that is, a transmission time point at which the wireless signal is transmitted from the first wireless communication device 110 by using a reception time point of the calculated wireless signal S1 and a distance d1 between the position-measuring device 100 and the first wireless communication device 110.

Accordingly, the controller 108 may calculate the travel time T1 of the corresponding wireless signal S1 by using the transmission time point at which the wireless signal S1 is transmitted from the first wireless communication device 110 and the reception time point at which the corresponding wireless signal S1 is received by the position-measuring device 100.

3) Travel Time T2 of Wireless Signal S2

In the same way as described above, a travel time T2 of the wireless signal S2 transmitted directly to the position-measuring device 100 after being transmitted from the second wireless communication device 120 may be calculated.

When the second wireless communication device 120 transmits a wireless signal, the position-measuring device 100 may receive the wireless signal transmitted from the second wireless communication device 120.

Regarding the wireless signals of the second wireless communication device 120, the position-measuring device 100 may receive each of the wireless signal S2 transmitted directly from the second wireless communication device 120 to the position-measuring device 100, and the wireless signal S2r that is transmitted to and reflected from the object 10.

When the two wireless signals S2 and S2r are received in this way, the controller 108 may extract respective reception time points of the corresponding wireless signals and store the reception time points in the memory 107.

The two wireless signals S2 and S2r are simultaneously transmitted from the second wireless communication device 120, but since S2 is directly transmitted to the position-measuring device 100 and S2r is reflected and transmitted from the object 10, the reception time point of S2 may be earlier than the reception time point of S2r.

Since the moving speed (i.e., propagation speed) of the wireless signal is the speed of light, the controller 108 may calculate a transmission time point of the corresponding wireless signal S2, that is, a transmission time point at which the wireless signal is transmitted from the second wireless communication device 120 by using a reception time point of the calculated wireless signal S2 and a distance d2 between the position-measuring device 100 and the second wireless communication device 120.

Accordingly, the controller 108 may calculate the travel time T2 of the corresponding wireless signal S2 by using the transmission time point at which the wireless signal S2 is transmitted from the second wireless communication device 120 and the reception time point at which the corresponding wireless signal S2 is received by the position-measuring device 100.

4) Travel Time to of Wireless Signal So

In addition, the controller 108 may calculate a travel time To of a wireless signal So transmitted from the position-measuring device 100 to the object 10.

First, when a wireless signal is transmitted from the position-measuring device 100, the controller 108 may extract a transmission time point at which the wireless signal is transmitted. In addition, when the wireless signal transmitted from the position-measuring device 100 and reflected from the object 10 is received, a reception time point of the corresponding wireless signal may be extracted.

As described above, by using the transmission time point and reception time point of the extracted wireless signal, it may be possible to calculate a travel time Tr of a wireless signal Sr that is transmitted to and reflected from the object 10.

Here, since such a travel time Tr is twice the travel time To of the wireless signal So, the travel time To may be calculated from an equation To=Tr/2.

5) Travel Time T1o of Wireless Signal S1o

In addition, the controller 108 may calculate a travel time T1o of a wireless signal S1o transmitted from the first wireless communication device 110 to the object 10.

as described above, when the first wireless communication device 110 transmits a wireless signal, the position-measuring device 100 may receive each of the wireless signal S1 transmitted directly from the first wireless communication device 110 to the position-measuring device 100, and the wireless signal S1r that is transmitted to and reflected from the object 10, and thus the reception time points of the two received wireless signals S1 and S1r may be stored in the memory 107.

Meanwhile, as described above, since the controller 108 calculates the transmission time point of the wireless signal transmitted from the first wireless communication device 110, a travel time T1r of a wireless signal S1r may be calculated by using the transmission time point of the corresponding wireless signal and the reception time point of the received wireless signal S1r.

In this case, since the travel time T1r of the wireless signal S1r is the sum of the travel time T1o of the wireless signal S1o and the travel time To of the wireless signal So, which is calculated above, the travel time T1o may be calculated from an equation T1o=T1r−To.

6) Travel Time T2o of Wireless Signal S2o

In addition, the controller 108 may calculate a travel time T2o of a wireless signal S2o transmitted from the second wireless communication device 120 to the object 10 in the same method as described above.

That is, as described above, when the second wireless communication device 120 transmits a wireless signal, the position-measuring device 100 may receive each of the wireless signal S2 transmitted directly from the second wireless communication device 120 to the position-measuring device 100, and the wireless signal S2r that is transmitted to and reflected from the object 10, and thus the reception time points of the two received wireless signals S2 and S2r may be stored in the memory 107.

In addition, as described above, since the controller 108 calculates the transmission time point of the wireless signal transmitted from the second wireless communication device 120, a travel time T2r of a wireless signal S2r may be calculated by using the transmission time point of the corresponding wireless signal and the reception time point of the received wireless signal S2r.

In this case, since the travel time T2r of the wireless signal S2r is the sum of the travel time T2o of the wireless signal S2o and the travel time To of the wireless signal So calculated above, the travel time T2o may be calculated from an equation T2o=T2r-To.

When To, T1o, and T2o are calculated as described above, the controller 108 applies the speed of light to the moving speed (i.e., propagation speed) of each wireless signal, so as to calculate respective distances from the position-measuring device 100 and the first and second wireless communication devices 110 and 120 to the object 10.

Accordingly, the position of the object 10 may be measured by using the respective distances from the position-measuring device 100 and the first and second wireless communication devices 110 and 120 to the object 10.

Such measurement of the position of the object 10 may use, for example, the triangulation method. The triangulation method is a method of determining coordinates and distance of a certain point by using the properties of a triangle, and since the method is a known technique, a detailed description thereof will be omitted.

Figure 5:
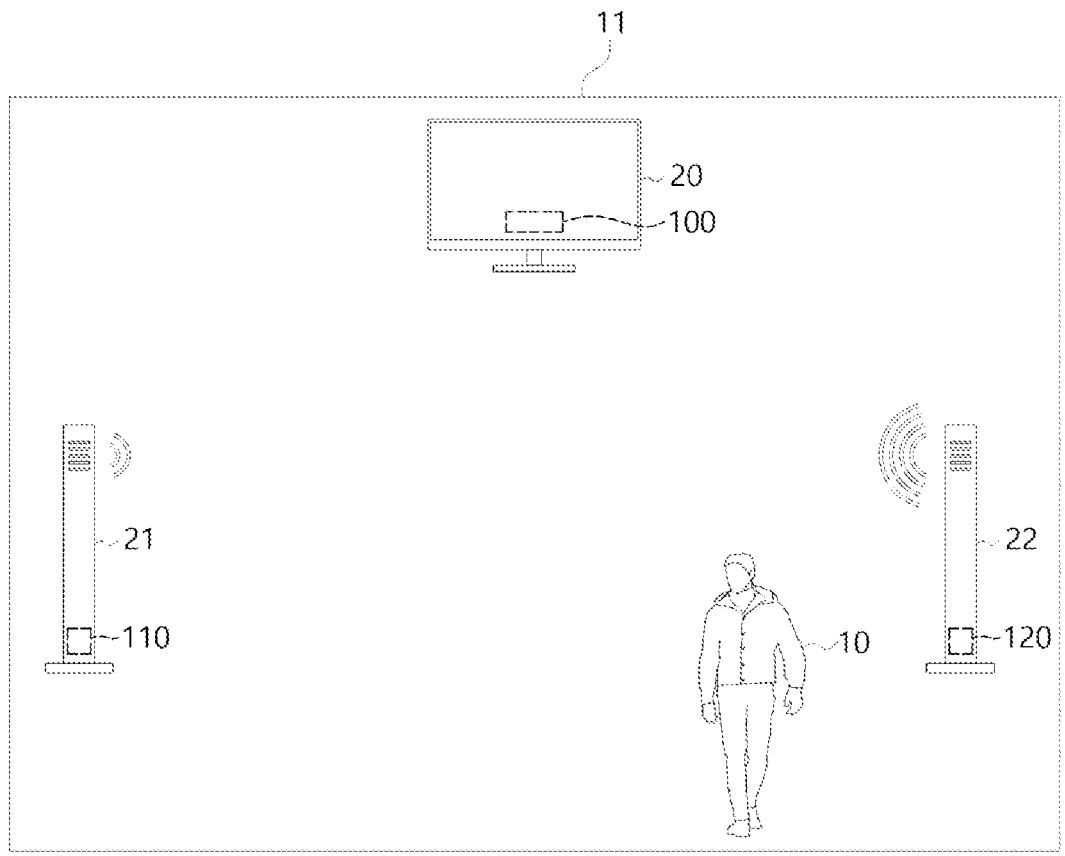
FIG. 5 is an exemplary view of the object position-measuring system applied to a home appliance in the exemplary embodiment of the present disclosure.

FIG. 5 is an exemplary view of the object position-measuring system applied to a home appliance in the exemplary embodiment of the present disclosure.

Referring to FIG. 5, the object position-measuring system according to the exemplary embodiment of the present disclosure may be applied to specific home appliances 20, 21, and 22.

As an example, the position-measuring device 100 may be installed in a smart TV 20, and the first and second wireless communication devices 110 and 120 may be respectively installed on a plurality of speakers 21 and 22 installed at a predetermined distance.

The position-measuring device 100 may measure a position of a user as an object 10 in real time or at a set period.

The smart TV 20 may adjust, for example, the volume of the plurality of speakers 21 and 22 according to the user's position measured by the position-measuring device 100.

In the drawing, as an example, when the position-measuring device 100 measures a position indicating that the user is present close to the second speaker 22, the smart TV 20 may adjust the volume of the second speaker 22 to be louder.

Optionally, the volume of the other first speaker 21 may be adjusted to be lower.

Figure 6:
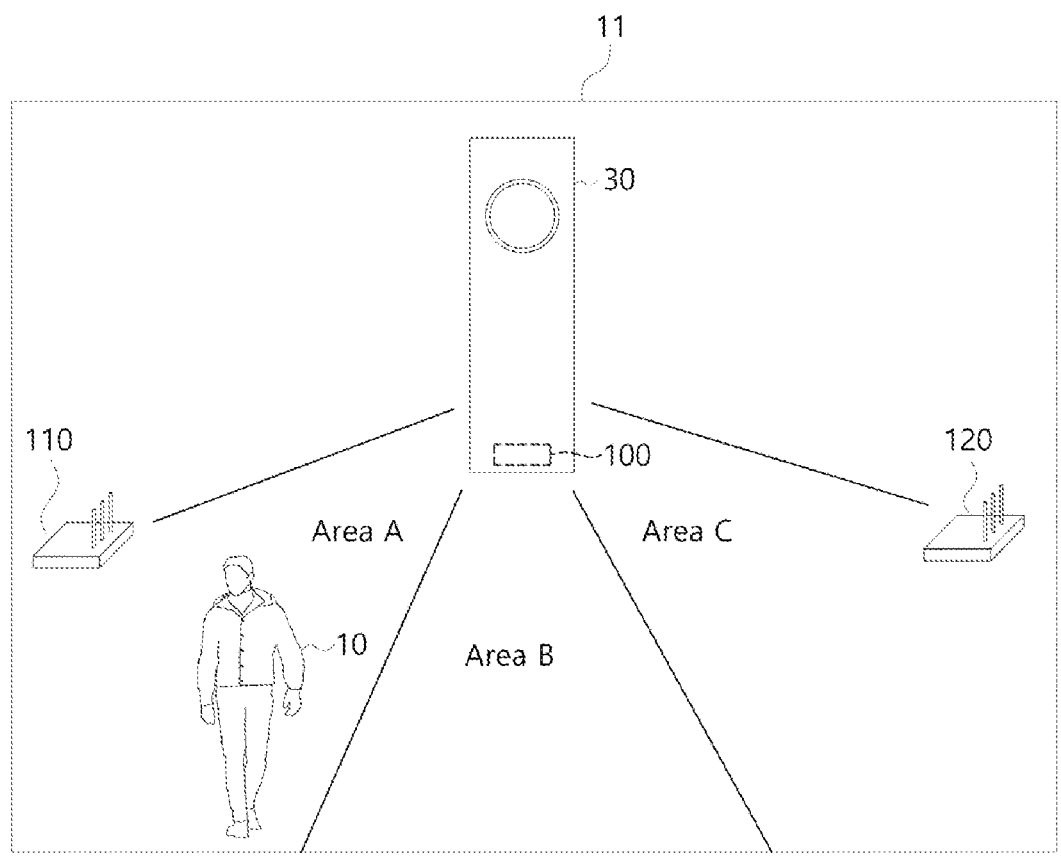
FIG. 6 is another exemplary view illustrating that an object position-measuring system is applied to another home appliance in another exemplary embodiment of the present disclosure.

FIG. 6 is another exemplary view illustrating that an object position-measuring system is applied to another home appliance in another exemplary embodiment of the present disclosure.

Referring to FIG. 6, similar to FIG. 5 described above, an object position-measuring system according to another exemplary embodiment of the present disclosure may also be applied to other home appliances 30, 31, and 32.

As another example, the position-measuring device 100 may be installed in an air conditioner 30, and the first and second wireless communication devices 110 and 120 may be installed at a predetermined distance apart.

The position-measuring device 100 may measure a user's position in real time or at a set period.

The air conditioner 30 may adjust, for example, an air volume and a wind direction according to the user's position measured by the position-measuring device 100.

In the drawing, for example, when the position-measuring device 100 measures the user's position indicating that the user is in an area A, the air conditioner 30 may adjust the wind direction to the area A. Optionally, the air volume may also be adjusted.

Figure 7:
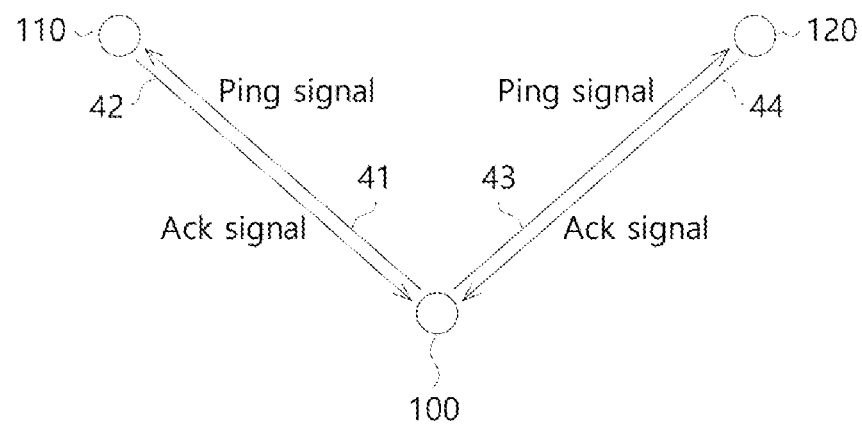
FIG. 7 is an exemplary view illustrating a process in which the object position-measuring device is communicating with first and second wireless communication devices according to the exemplary embodiment of the present disclosure.

FIG. 7 is an exemplary view illustrating a process in which the object position-measuring device is communicating with first and second wireless communication devices according to the exemplary embodiment of the present disclosure.

Referring to FIG. 7, the position-measuring device 100 according to the exemplary embodiment of the present disclosure may be capable of performing two-way wireless communication with the first and second wireless communication devices 110 and 120.

The position-measuring device 100 may transmit ping signals 41 and 43.

Accordingly, the first and second wireless communication devices 110 and 120 may respectively receive these ping signals 41 and 43, and may respectively transmit ACK signals 42 and 44 indicating reception of the ping signals as a response.

The position-measuring device 100 may receive the ACK signals.

Naturally, the ping signal is an example, and the position-measuring device 100 and the first and second wireless communication devices 110 and 120 may transmit and receive a page signal according to the implemented characteristics.

The ping signal or page signal transmitted from the position-measuring device 100 may include: a request command for requesting the position information of the first and second wireless communication devices 110 and 120; and/or a setting command for setting a wireless signal transmission time in each of the first and second wireless communication devices 110 and 120.

When the ping signal or page signal is received, the first and second wireless communication devices 110 and 120 may respectively transmit their own position information according to the request command and/or the setting command included therein, or may respectively transmit wireless signals according to a set transmission time.

Meanwhile, the position-measuring device 100 may also transmit its own wireless signal according to the respective wireless signal transmission times of the first and second wireless communication devices 110 and 120.

In this way, the position-measuring device 100 and the first and second wireless communication devices 110 and 120 transmit respective wireless signals at the same time, whereby processing time to calculate the travel time T of each wireless signal and the distances between each device may be shortened.

Figure 8:
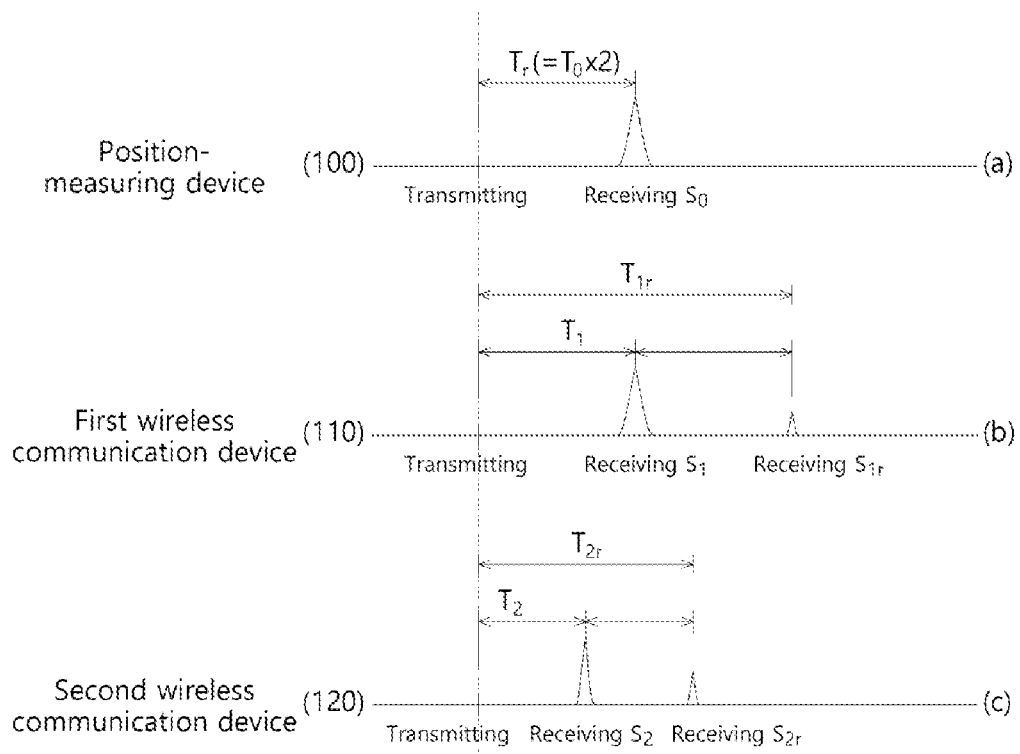
FIG. 8 is another exemplary view for illustrating a waveform of a wireless signal received by the object position-measuring device according to another exemplary embodiment of the present disclosure.

FIG. 8 is another exemplary view for illustrating a waveform of a wireless signal received by the object position-measuring device according to another exemplary embodiment of the present disclosure.

Referring to FIG. 8, in another exemplary embodiment of the present disclosure, an example is illustrated, wherein the position-measuring device 100 and the first and second wireless communication devices 110 and 120 respectively transmit their wireless signals at the same time.

The position-measuring device 100 may know the transmission time point when transmitting its own wireless signal, so the transmission time point of the wireless signals respectively transmitted from the first and second wireless communication devices 110 and 120 may also be known.

Accordingly, in the position-measuring device 100, when the plurality of wireless signals is respectively received by the first and second wireless communication devices 110 and 120, the travel time T of each wireless signal and the time to calculate the distance between the first and second wireless communication devices 110 and 120 may be shortened and the processing logic may become relatively simple.

Figure 9:
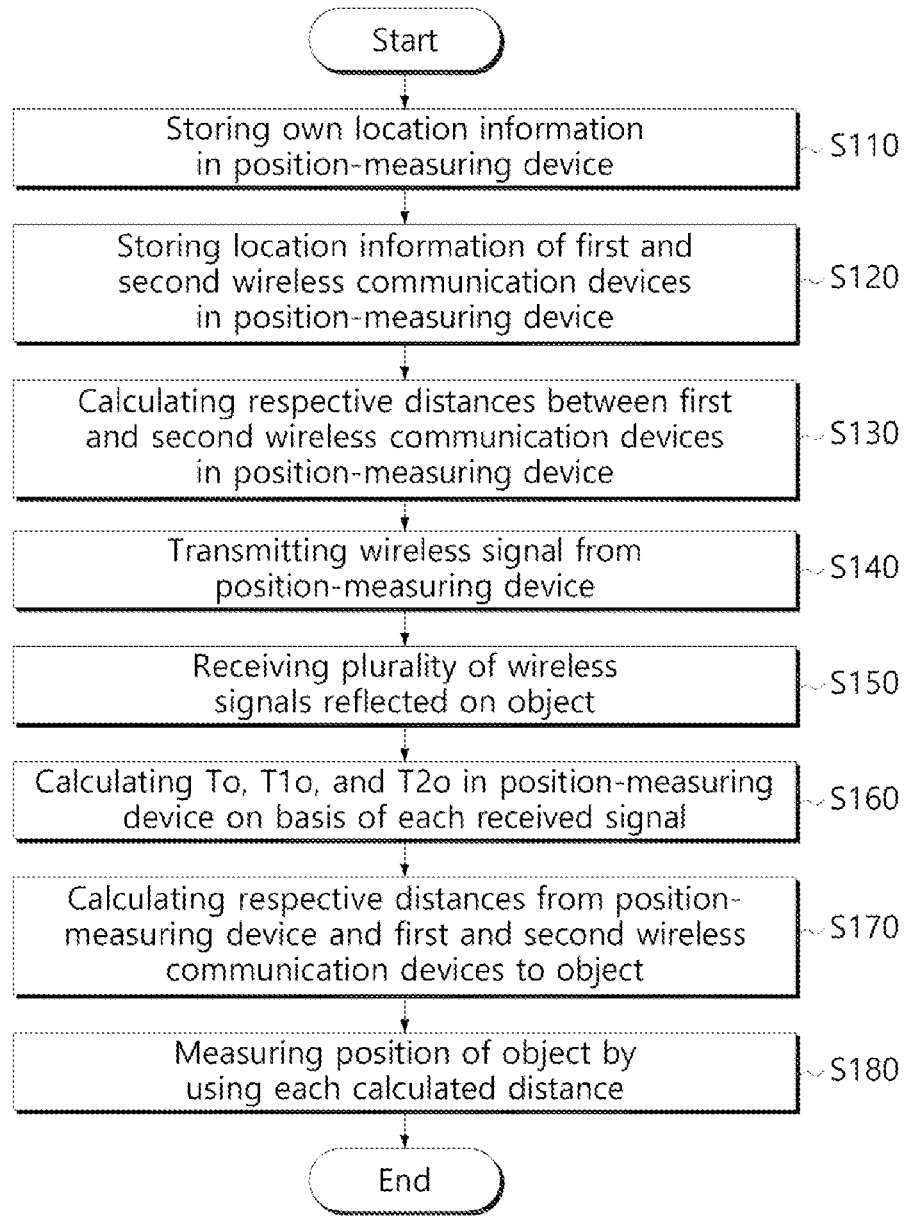
FIG. 9 is a flowchart illustrating a process of measuring a position of an object in the object position-measuring system according to the exemplary embodiment of the present disclosure.

FIG. 9 is a flowchart illustrating the process of measuring a position of an object in the object position-measuring system according to the exemplary embodiment of the present disclosure.

Referring to FIG. 9, in the object position-measuring method according to the exemplary embodiment of the present disclosure, in step S110, the position-measuring device 100 may store its own position information therein. Such position information may be input to the position-measuring device 110 by a user. The position information may be expressed in two-dimensional coordinates or three-dimensional coordinates.

In addition, in step S120, the position-measuring device 100 may also store the respective position information of the first and second wireless communication devices 110 and 120. Such position information may also be input to the position-measuring device 100 by the user.

In another exemplary embodiment, the position-measuring device 100 may receive and store respective position information from the first and second wireless communication devices 110 and 120.

In this case, the position-measuring device 100 may request and receive the respective position information from the first and second wireless communication devices 110 and 120. When the first and second wireless communication devices 110 and 120 transmit their own position information without a request, the position-measuring device 100 may also receive the position information.

In step S130, the controller 108 of the position-measuring device 100 may use the position information stored therein to calculate respective distances d1 and d2 from the position-measuring device 100 to the first and second wireless communication devices 110 and 120, and then may store the distances therein.

In step S140, in order to measure the position of the object 10, the position-measuring device 100 may transmit its own wireless signal in real time or according to a set period.

In addition, in step S150, the position-measuring device 100 may receive the plurality of wireless signals. The plurality of wireless signals received in this way may include: a wireless signal transmitted from the position-measuring device 100 and then reflected from the object 10; wireless signals transmitted directly and respectively from the first and second wireless communication devices 110 and 120 to the position-measuring device 100; and wireless signals respectively transmitted from the first and second wireless communication devices 110 and 120 and then reflected from the object 10.

In step S160, the speed of light is applied as the moving speed (i.e., propagation speed) of each wireless signal, and the travel times of the plurality of wireless signals may be calculated by using the respective transmission time point and reception time point of the wireless signals.

In particular, in step S160, travel times may be respectively calculated, including: a travel time To of a wireless signal So transmitted from the position-measuring device 100 to the object 10; a travel time T1o of a wireless signal S1o transmitted from the first wireless communication device 110 to the object 10; and a travel time T2o of a wireless signal S2o transmitted from the second wireless communication device 120 to the object 10.

Next, in step S170, respective distances from the position-measuring device 100 and the first and second wireless communication devices 110 and 120 to the object 10 may be calculated by using the calculated travel times To, T1o, and T2o.

In step S180, the controller 108 may measure a position of the object 10 by using the calculated respective distances from the position-measuring device 100 and the first and second wireless communication devices 110 and 120 to the object 10.

Such a position of the object 10 may be a relative position with respect to the position-measuring device 100 as a reference.

Figure 10:
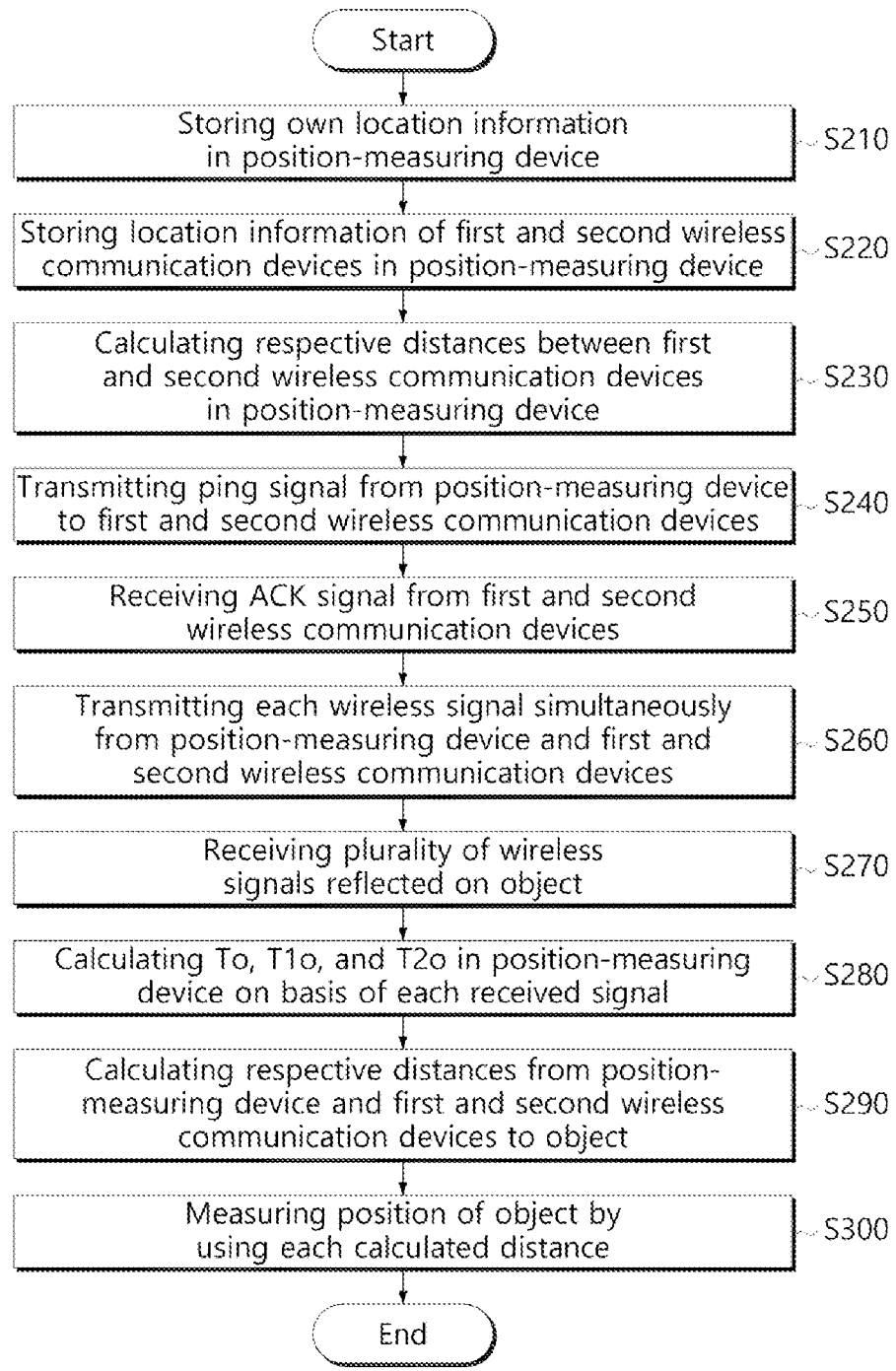
FIG. 10 is a flowchart illustrating a process of measuring a position of an object in the object position-measuring system according to another exemplary embodiment of the present disclosure.

FIG. 10 is a flowchart illustrating the process of measuring a position of an object in the object position-measuring system according to another exemplary embodiment of the present disclosure.

Referring to FIG. 10, in another exemplary embodiment of the present disclosure, the position-measuring device 100 may store its own position information in step S210, and may also store respective position information of the first and second wireless communication devices 110 and 120 in step S220.

Such position information may be input to the position-measuring device 110 by the user.

In another exemplary embodiment, the position-measuring device 100 may receive and store respective position information from the first and second wireless communication devices 110 and 120.

In step S230, the controller 108 of the position-measuring device 100 may use the position information stored therein to calculate respective distances d1 and d2 from the position-measuring device 100 to the first and second wireless communication devices 110 and 120, and then may store the distances therein.

The position-measuring device 100 may transmit, for example, respective ping signals to the first and second wireless communication devices 110 and 120 in step S240, and may receive respective ACK signals from the first and second wireless communication devices 110 and 120 in response to reception of the ping signals in step S250.

Such ping signals may include information for setting transmission time points of wireless signals transmitted from the first and second wireless communication devices 110 and 120.

Accordingly, in step S260, the position-measuring device 100 and the first and second wireless communication devices 110 and 120 may transmit their respective wireless signals at the same time according to the set transmission time point.

In addition, in step S270, the position-measuring device 100 may receive the plurality of wireless signals. The plurality of wireless signals received in this way may include: a wireless signal transmitted from the position-measuring device 100 itself and then reflected from the object 10; wireless signals transmitted directly and respectively from the first and second wireless communication devices 110 and 120 to the position-measuring device 100; and wireless signals respectively transmitted from the first and second wireless communication devices 110 and 120 and then reflected from the object 10.

In step S280, each travel time of the plurality of wireless signals may be calculated by applying the speed of light to the moving speed (i.e., propagation speed) of each wireless signal and using the transmission time point and reception time point of each wireless signal.

In this case, in step S280, respective travel times may be calculated, including: a travel time To of the wireless signal So transmitted from the position-measuring device 100 to the object 10; a travel time T1o of the wireless signal S1o transmitted from the first wireless communication device 110 to the object 10; and a travel time T2o of the wireless signal S2o transmitted from the second wireless communication device 120 to the object 10.

Next, in step S290, respective distances from the position-measuring device 100 and the first and second wireless communication devices 110 and 120 to the object 10 may be calculated by using the calculated travel times To, T1o, and T2o.

In step S300, the controller 108 may measure the position of the object 10 by using the calculated respective distances from the position-measuring device 100 and the first and second wireless communication devices 110 and 120 to the object 10.

Such a position of the object 10 may be a relative position with respect to the position-measuring device 100 as a reference.

Figure 11:
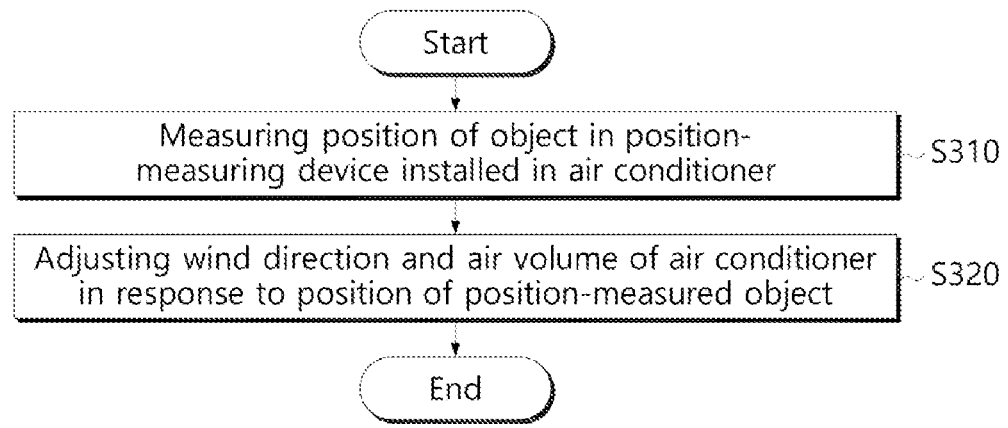
FIG. 11 is a flowchart illustrating an operation control process of an air conditioner in which the object position-measuring device is installed as the exemplary embodiment of the present disclosure.

FIG. 11 is a flowchart illustrating an operation control process of an air conditioner in which the object position-measuring device is installed as the exemplary embodiment of the present disclosure.

Referring to FIG. 11, for example, in the position-measuring device 100 installed in the air conditioner, a position of a user, who is the object 10, is measured by the above method in step S310, and the wind direction and air volume of the air conditioner may be adjusted in response to the measured position in step S320.

Figure 12:
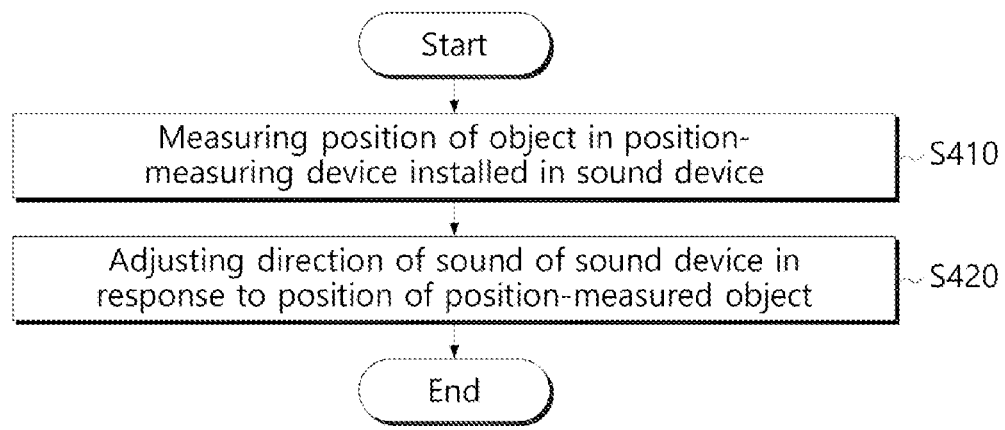
FIG. 12 is a flowchart illustrating an operation control process of a sound device in which the object position-measuring device is installed as another exemplary embodiment of the present disclosure.

FIG. 12 is a flowchart illustrating an operation control process of a sound device in which the object position-measuring device is installed as another exemplary embodiment of the present disclosure.

Referring to FIG. 12, in another exemplary embodiment, the position-measuring device 100 installed in the sound device (or a smart TV) measures a position of a user, who is the object 10 in step S410, and corresponding to the measured position, the direction or volume of sound may be adjusted in step S420.

As described above, by applying the object position-measuring system according to the present disclosure to home appliances, it is possible to provide convenience to the user and to provide user-centered services in real life.

Although the exemplary embodiments of the present disclosure have been described above with reference to the accompanying drawings, it will be understood that those skilled in the art to which the present disclosure pertains may implement the present disclosure in other specific forms without departing from the technical spirit or essential features thereof. Therefore, it should be understood that the above-described exemplary embodiments are illustrative in all respects and not restrictive.

Recently, with the development of wireless communication technology, home appliances have become intelligent and multi-functional, providing users with convenience in use and excellent service.

In particular, with the advent of 5G Internet-based high-speed wireless networking and home appliances to which AI technology is applied, there is a trend that total home networking is becoming possible, whereby user-centered convenient services are being provided at home.

The present specification describes the position-measuring device and the position-measuring system to which the position-measuring device is applied, and as examples, exemplary embodiments in which the position-measuring system is applied to some home appliances are described, but the present disclosure is not limited to these exemplary embodiments, and it should be noted that any home appliance may all be applicable, as long as the home appliances are provided with an environment, device, or equipment to which the Internet-based wireless communication device according to the present disclosure may be able to transmit wireless signals.

The invention claimed is:

1. An object position-measuring device, comprising:
a transmitting antenna configured to transmit a wireless signal;
a receiving antenna configured to receive a plurality of wireless signals; and
a controller configured to measure a position of an object by using a travel time of each of the plurality of wireless signals received by the receiving antenna,
wherein the controller calculates a travel time (To) of the wireless signal transmitted from the transmitting antenna to the object, a travel time (T1o) of a wireless signal transmitted from a first wireless communication device to the object, and a travel time (T2o) of a wireless signal transmitted from a second wireless communication device to the object, and measures the position of the object by calculating respective distances from the position-measuring device and the first and second wireless communication devices to the object on a basis of the calculated travel times (To, T1o, and T2o),
wherein the controller calculates the travel time (To) by using a travel time (Tr) of the wireless signal transmitted from the transmitting antenna and reflected from the object,
wherein the controller calculates the travel time (T1o) by using a time difference between a travel time (T1or) of the wireless signal transmitted from the first wireless communication device and reflected from the object and the calculated travel time (To),
wherein the controller calculates the travel time (T2o) by using a time difference between a travel time (T2or) of the wireless signal transmitted from the second wireless communication device and reflected from the object and the calculated travel time (To), and
wherein the controller calculates the respective distances from the position-measuring device and the first and second wireless communication devices to the object by using the calculated travel times (To, T1o, and T2o).

2. The object position-measuring device of claim 1, wherein the controller stores respective position information of the position-measuring device and the first and second wireless communication devices.

3. The object position-measuring device of claim 2, wherein the controller calculates respective distances between the position-measuring device and the first and second wireless communication devices by using the stored position information.

4. The object position-measuring device of claim 2, wherein the controller calculates transmission time points of the wireless signals respectively transmitted from the position-measuring device and the first and second wireless communication devices by using the stored position information and moving speed of each wireless signal.

5. The object position-measuring device of claim 4, wherein the controller calculates the travel times of the received wireless signals by using the transmission time points and reception time points of the received wireless signals.

6. The object position-measuring device of claim 1, wherein the controller measures the position of the object on a basis of the plurality of wireless signals received by the receiving antenna at each set period.

7. An object position-measuring system, comprising:
a first wireless communication device configured to transmit a wireless signal;
a second wireless communication device configured to transmit a wireless signal different from the wireless signal transmitted by the first wireless communication device; and
a position-measuring device configured to receive a plurality of wireless signals,
wherein the position-measuring device calculates a travel time (To) of a wireless signal transmitted from the position-measuring device to an object, a travel time (T1o) of the wireless signal transmitted from the first wireless communication device to the object, and a travel time (T2o) of the wireless signal transmitted from the second wireless communication device to the object, and measures a position of the object by calculating respective distances from the position-measuring device and the first and second wireless communication devices to the object on a basis of the calculated travel times (To, T1o, and T2o),
wherein the position-measuring device calculates the travel time (To) by using a travel time (Tr) of the wireless signal transmitted from the position-measuring device and reflected from the object,
wherein the position-measuring device calculates the travel time (T1o) by using a time difference between a travel time (T1or) of the wireless signal transmitted from the first wireless communication device and reflected from the object and the calculated travel time (To),
wherein the position-measuring device calculates the travel time (T2o) by using a time difference between a travel time (T2or) of the wireless signal transmitted from the second wireless communication device and reflected from the object and the calculated travel time (To), and
wherein the position-measuring device calculates the respective distances from the position-measuring device and the first and second wireless communication devices to the object by using the calculated travel times (To, T1o, and T2o).

8. The object position-measuring system of claim 7, wherein the position-measuring device calculates respective distances between the position-measuring device and the first and second wireless communication devices by using internally stored position information of the position-measuring device and the first and second wireless communication devices.

9. The object position-measuring system of claim 8, wherein the position-measuring device calculates transmission time points of the wireless signals respectively transmitted from the position-measuring device and the first and second wireless communication devices by using the stored position information and by using moving speed of the wireless signals.

10. The object position-measuring system of claim 9, wherein the position-measuring device calculates a travel times of the received wireless signals by using reception time points and the transmission time points of the received wireless signals.

11. The object position-measuring system of claim 7, wherein the position-measuring device and the first and second wireless communication devices transmit respective wireless signals at a same time.

12. The object position-measuring system of claim 11, wherein the position-measuring device transmits a ping signal for setting transmission time points of the wireless signals respectively transmitted from the position-measuring device and the first and second wireless communication devices to each of the first and second wireless communication devices.

13. The object position-measuring system of claim 7, wherein the position-measuring device and the first and second wireless communication devices are mounted on at least one or more position-fixed devices selected from an air conditioner, a smart TV, a refrigerator, a lighting device, a computer, and a sound device, or are mounted on at least one or more position-movable devices selected from a robot vacuum cleaner, a laptop computer, a fan, and a speaker.

14. An object position-measuring method, comprising:
storing, in a position-measuring device, position information of the position-measuring device itself and first and second wireless communication devices;
calculating respective distances from the position-measuring device to the first and second wireless communication devices;
transmitting a wireless signal from the position-measuring device;
receiving a plurality of wireless signals by the position-measuring device; and
measuring a position of an object on a basis of the plurality of received wireless signals,
wherein the measuring the position of the object includes calculating a travel time (To) of the wireless signal transmitted from the position-measuring device to the object, a travel time (T1o) of a wireless signal transmitted from the first wireless communication device to the object, and a travel time (T2o) of a wireless signal transmitted from the second wireless communication device to the object, and measures the position of the object by calculating respective distances from the position-measuring device and the first and second wireless communication devices to the object on a basis of the calculated travel times (To, T1o, and T2o),
wherein the measuring of the position of the object includes calculating the travel time (To) by using a travel time (Tr) of the wireless signal transmitted from the position-measuring device and reflected from the object, calculating the travel time (T1o) by using a time difference between a travel time (T1or) of the wireless signal transmitted from the first wireless communication device and reflected from the object and the calculated travel time (To), and calculating the travel time (T2o) by using a time difference between a travel time (T2or) of the wireless signal transmitted from the second wireless communication device and reflected from the object and the calculated travel time (To).

15. The object position-measuring method of claim 14, wherein the measuring of the position of the object includes measuring the position of the object by using a triangulation method on the basis of the calculated travel times (To, T1r, and T2r).

16. The object position-measuring method of claim 14, wherein the measuring of the position of the object includes calculating respective transmission time points of the wireless signals respectively transmitted from the position-measuring device and the first and second wireless communication devices by using the stored position information and respective moving speed of the wireless signals, and calculating respective travel times of the received wireless signals by using reception time points and the respective transmission time points of the wireless signals.

* * * * *